US008113246B2

United States Patent
Hsieh

(10) Patent No.: US 8,113,246 B2
(45) Date of Patent: Feb. 14, 2012

(54) VACUUM FRESH-KEEPING COVER

(76) Inventor: Kuo Chin Hsieh, Taishan Shiang (TW)

(\*) Notice: Subject to any disclaimer, the term of this patent is extended or adjusted under 35 U.S.C. 154(b) by 970 days.

(21) Appl. No.: 12/048,803

(22) Filed: Mar. 14, 2008

(65) Prior Publication Data

US 2009/0101535 A1   Apr. 23, 2009

(30) Foreign Application Priority Data

Oct. 19, 2007  (CN) .......................... 2007 1 0151474

(51) Int. Cl.
*B65B 31/00* (2006.01)

(52) U.S. Cl. ......... 141/65; 141/8; 141/197; 220/203.01; 220/231; 220/367.1; 215/260; 215/262

(58) Field of Classification Search ............. 141/65, 141/192, 197, 8; 220/202, 203.01, 231, 367.1; 215/260, 262, 270
See application file for complete search history.

(56) References Cited

U.S. PATENT DOCUMENTS

| | | | | |
|---|---|---|---|---|
| 4,243,349 A * | 1/1981 | Hickey et al. | ............... | 206/524.8 |
| 4,984,611 A * | 1/1991 | Takatsuki et al. | ............... | 141/65 |
| 5,546,997 A * | 8/1996 | Miramon | ............... | 141/65 |
| 5,651,470 A * | 7/1997 | Wu | ............... | 220/212 |
| 5,692,632 A * | 12/1997 | Hsieh et al. | ............... | 220/212 |
| 5,735,317 A * | 4/1998 | Wu | ............... | 141/65 |
| 5,779,082 A * | 7/1998 | Miramon | ............... | 220/212 |
| 5,803,282 A * | 9/1998 | Chen et al. | ............... | 215/228 |
| 5,806,575 A * | 9/1998 | Tsay | ............... | 141/65 |
| 5,964,255 A * | 10/1999 | Schmidt | ............... | 141/65 |
| 6,470,924 B2 * | 10/2002 | Chen | ............... | 141/65 |
| 6,609,536 B2 * | 8/2003 | Chen | ............... | 137/565.23 |
| 6,662,831 B2 * | 12/2003 | Chen | ............... | 141/65 |
| 6,789,690 B2 * | 9/2004 | Nieh et al. | ............... | 220/231 |
| 6,830,081 B1 * | 12/2004 | Chen | ............... | 141/65 |
| 6,968,870 B1 * | 11/2005 | Tsay | ............... | 141/65 |
| 6,994,227 B2 * | 2/2006 | Kwon | ............... | 220/212 |
| 7,040,356 B2 * | 5/2006 | Tarlow | ............... | 141/65 |
| 7,048,136 B2 * | 5/2006 | Havens et al. | ............... | 220/212 |
| 7,131,550 B2 * | 11/2006 | Vilalta et al. | ............... | 220/231 |
| 7,571,748 B2 * | 8/2009 | Shao | ............... | 141/66 |
| 7,677,166 B2 * | 3/2010 | Tsai | ............... | 99/472 |
| 7,721,771 B2 * | 5/2010 | Tsay | ............... | 141/65 |
| 7,931,052 B2 * | 4/2011 | Schooley | ............... | 141/65 |
| 2006/0227492 A1 * | 10/2006 | Tai | ............... | 361/230 |
| 2007/0034628 A1 * | 2/2007 | Adrian | ............... | 220/230 |
| 2007/0056971 A1 * | 3/2007 | Hsieh | ............... | 220/230 |

\* cited by examiner

*Primary Examiner* — Gregory Huson
*Assistant Examiner* — Nicolas A Arnett
(74) *Attorney, Agent, or Firm* — Jackson IPG PLLC; Demian K. Jackson

(57) ABSTRACT

A vacuum fresh-keeping cover includes an upper cover, a top of which is connected with an air suction-ventilation device, a lower rim of which is connected with a soft gasket that can be suppressed on any horizontal surface, and an interior of which is formed with a container space. When a barometric value of the container space gets larger, the air suction-ventilation device is activated to expel out air in the container space continuously, to keep the container space at a near vacuum condition for preserving objects or food. When pulling up a touching element of the air suction-ventilation device, the air in the container space is drained out by the air suction-ventilation device to quickly remove the upper cover, to facilitate consumers for use, and to conveniently separate the air suction-ventilation device from the upper cover, for easily washing the upper cover with water.

14 Claims, 15 Drawing Sheets

VACUUM FRESH-KEEPING COVER

BACKGROUND OF THE INVENTION a) Field of the Invention

The present invention relates to a vacuum fresh-keeping cover, and more particularly to a cover which can be suppressed on any horizontal surface to suck out air in a container space of the cover by suppression, allowing a barometric value in the container space to be decreased to approach to a vacuum state, so as to keep food or objects fresh in the container space. In addition, as the cover can be separated from an air suction-ventilation device, the cover can be quickly and conveniently washed with water.

b) Description of the Prior Art

A conventional vacuum fresh-keeping container is disclosed in a typical example of a food container in the US Patent Publication No. US2007/0034628 A1, wherein its cover is connected with a casing, and an air suction pump is located inside the casing; therefore, the casing is not able to be washed effectively with water. Moreover, as the cover and the casing are mantled by one to one fitting, the cover cannot be independently mantled and implemented on any surface in a negative pressure condition.

SUMMARY OF THE INVENTION

Accordingly, the primary object of the present invention is to provide a vacuum fresh-keeping cover that can be implemented on any horizontal surface by the cover.

Another object of the present invention is to provide a vacuum fresh-keeping cover, wherein the cover and an air suction-ventilation device can be screwed together and separated, such that the independent cover can be washed quickly and conveniently with water.

Still another object of the present invention is to provide a vacuum fresh-keeping cover, wherein upon implementing a negative pressure condition, a container space of the cover can be kept at the negative pressure and a near vacuum condition for a long time.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
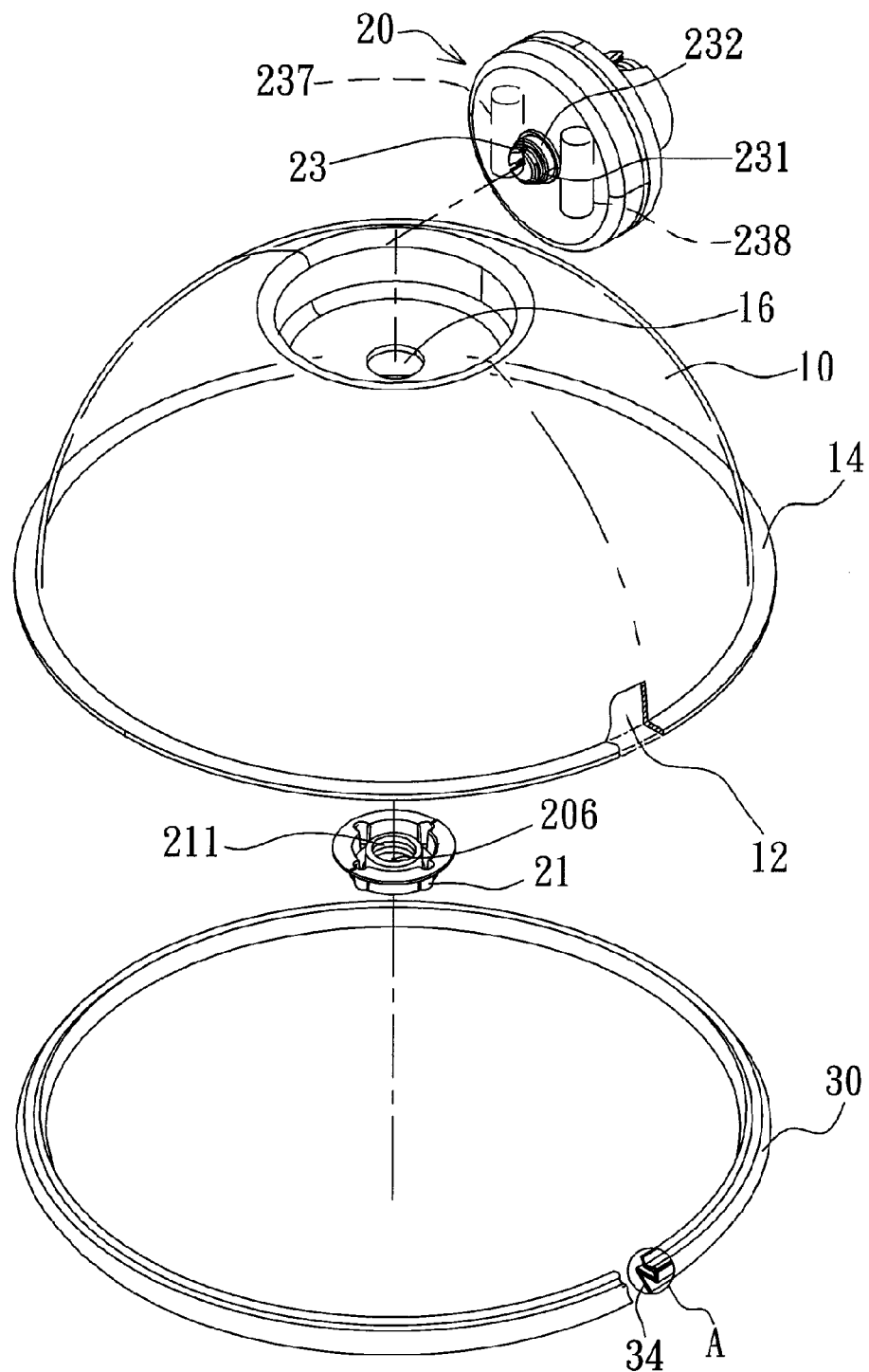
FIG. 1 shows an exploded view of an air suction-ventilation device and an upper cover of the present invention.
Figure 2:
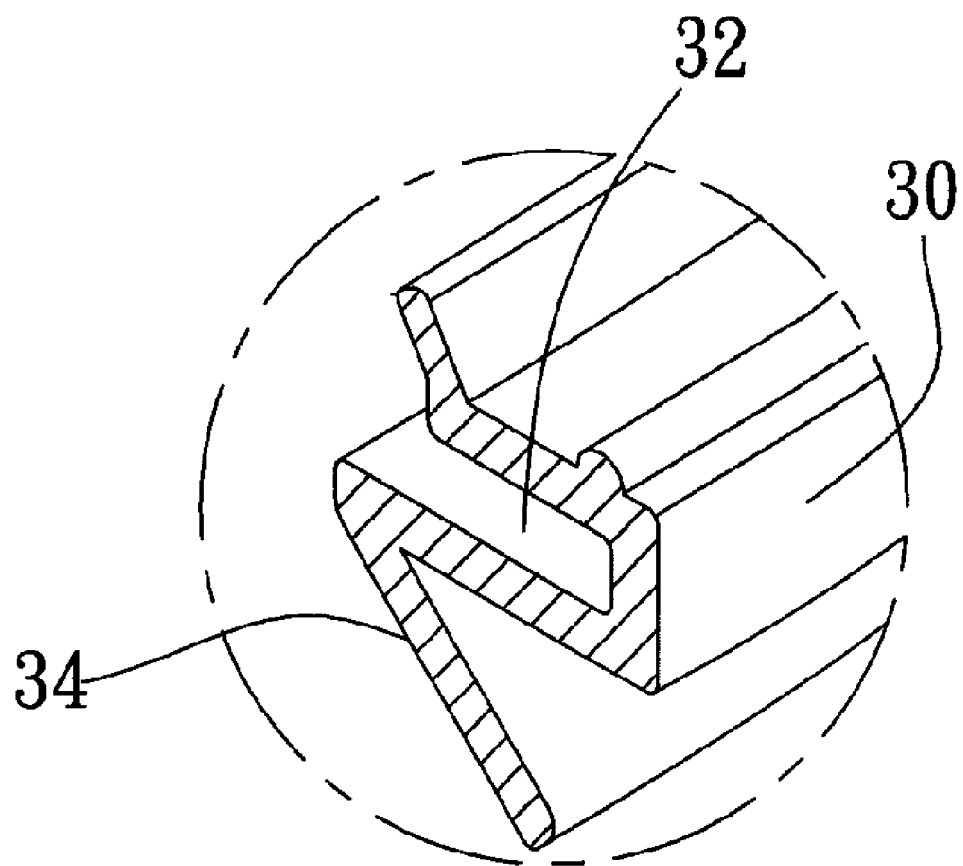
FIG. 2 shows a blow-up view of a region A in FIG. 1.
Figure 3:
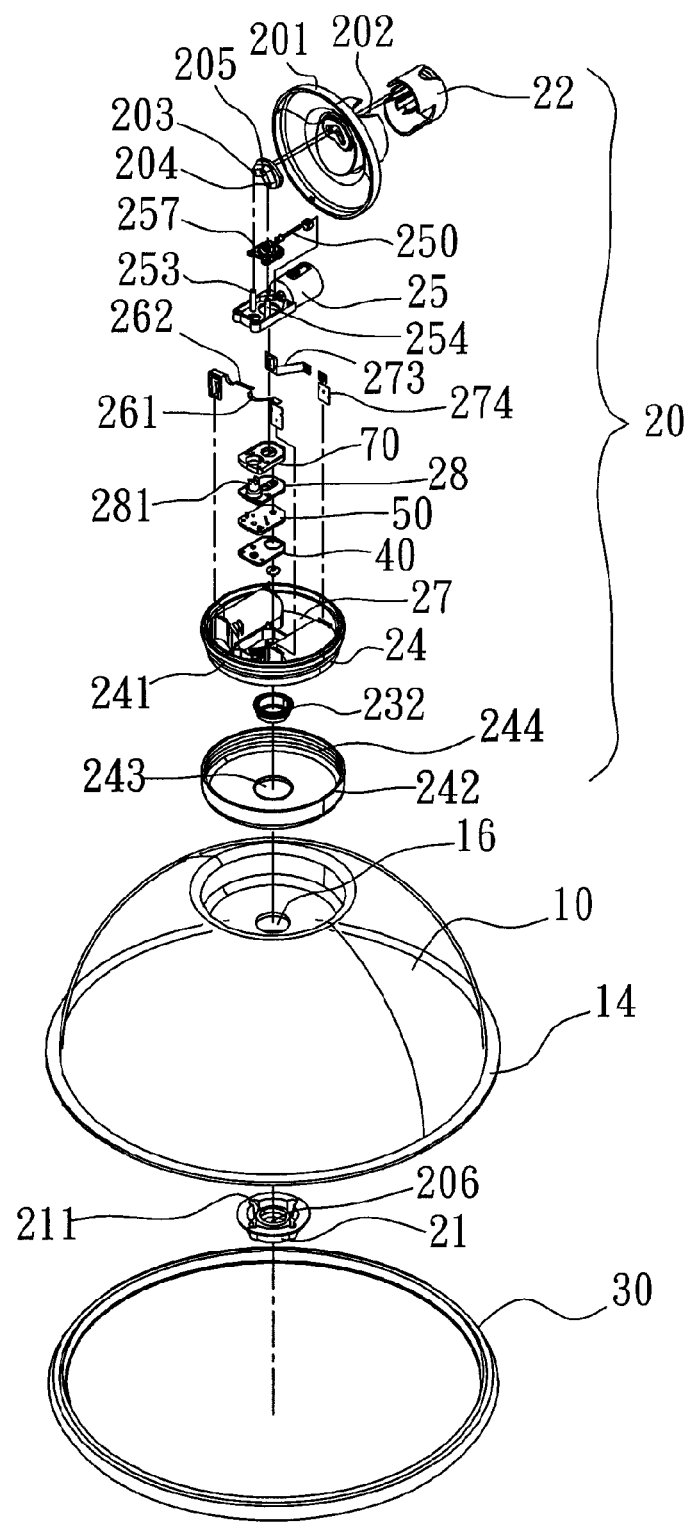
FIG. 3 shows another exploded view of an air suction-ventilation device and an upper cover of the present invention.
Figure 8:
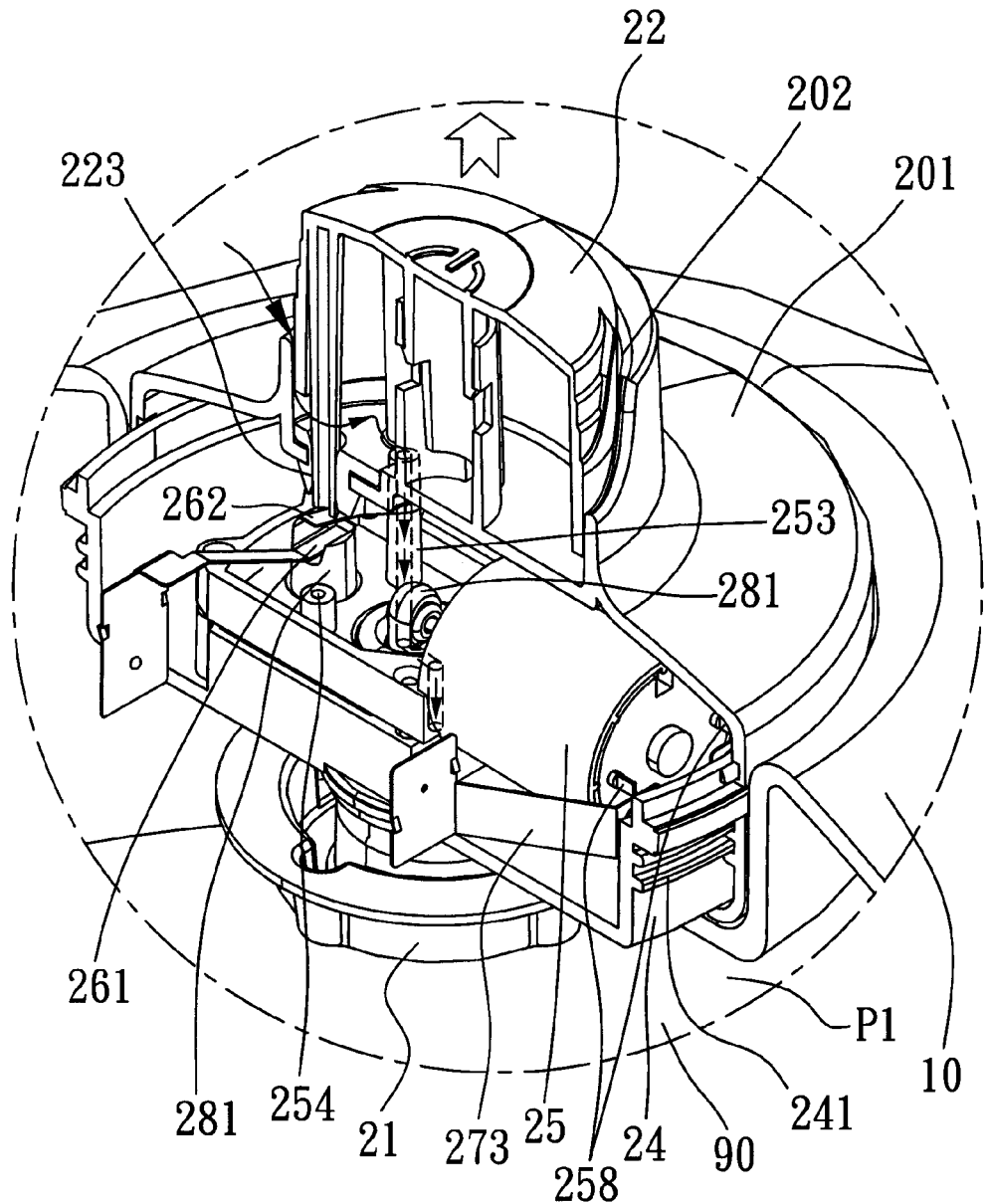
FIG. 8 shows a cutaway view of an action that an air suction pump stops operating by pulling up a touching element in an air suction-ventilation device of the present invention.
Figure 12:
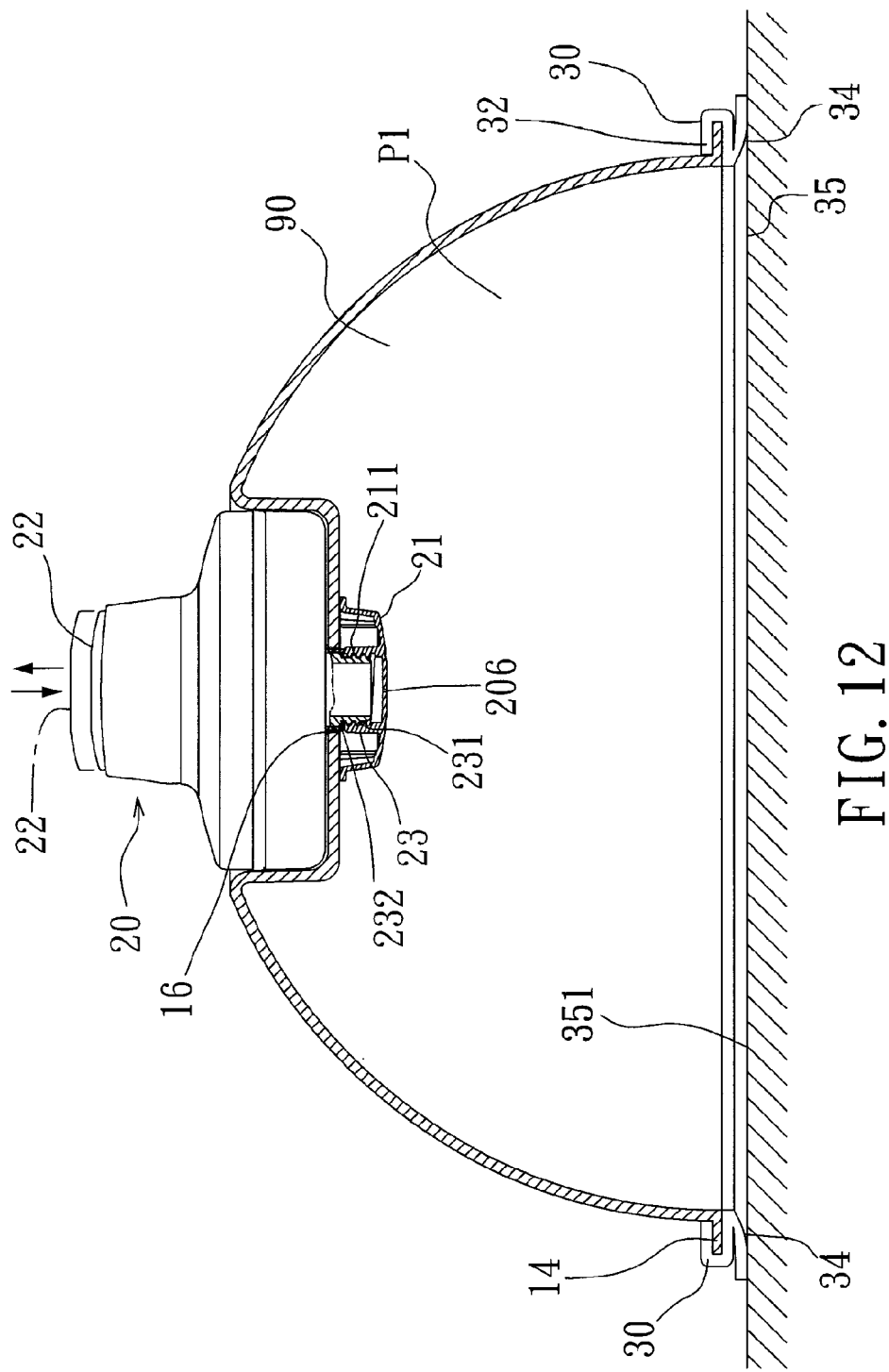
FIG. 12 shows a local cross sectional view of an upper cover of the present invention that is mantled on a desktop.

Referring to FIGS. 1 to 3, the present invention includes an upper cover 10, an interior of which is provided with a container space 12, a top of which is connected to an air suction-ventilation device 20, and a lower rim of which is provided with a connecting part 14; a soft gasket 30, a side of which is provided with a connecting slot 32 (as shown in FIG. 2), with the connecting slot 32 being air-tightly fitted into the connecting part 14 and the soft gasket 30 flexibly deforming downward in an air-tight condition, so as to be tightly suppressed on a surface 351 (as shown in FIG. 12); the air suction-ventilation device 20 which is connected above the upper cover 10 and is composed of a bottom air suction-ventilation hole 206 being connected with the container space 12, a top touching element 22 being able to displace up and down, an air suction pump 25, and a lower spring leaf 261 and an upper spring leaf 262 at a side of the air suction pump 25; and a barometric sensing element 28, a top of which is provided with a projected body 281 being connected at the lower spring leaf 261, such that when a barometric value P1 of the container space 12 is detected high by the barometric sensing element 28 (as shown in FIG. 8), the barometric sensing element 28 will be driven by the high barometric value to be flexibly ascended and restored, so as to drive simultaneously the lower spring leaf 261 to ascend to touch the upper spring leaf 261, thereby conducting an electric circuit to activate the air suction pump 25 for drawing air 90 inside the container space 12 out of the upper cover 10 through the air suction-ventilation hole 206; on the other hand, when the barometric value P1 of the container space 12 decreases, the barometric sensing element 28 can flexibly descend and displace by an operation of a negative pressure in the container space 12, to drive the lower spring leaf 261 to descend and displace, thereby forming an off-circuit condition by the upper and lower spring leaves 262, 261 to stop the air suction pump 25.

Figure 7:
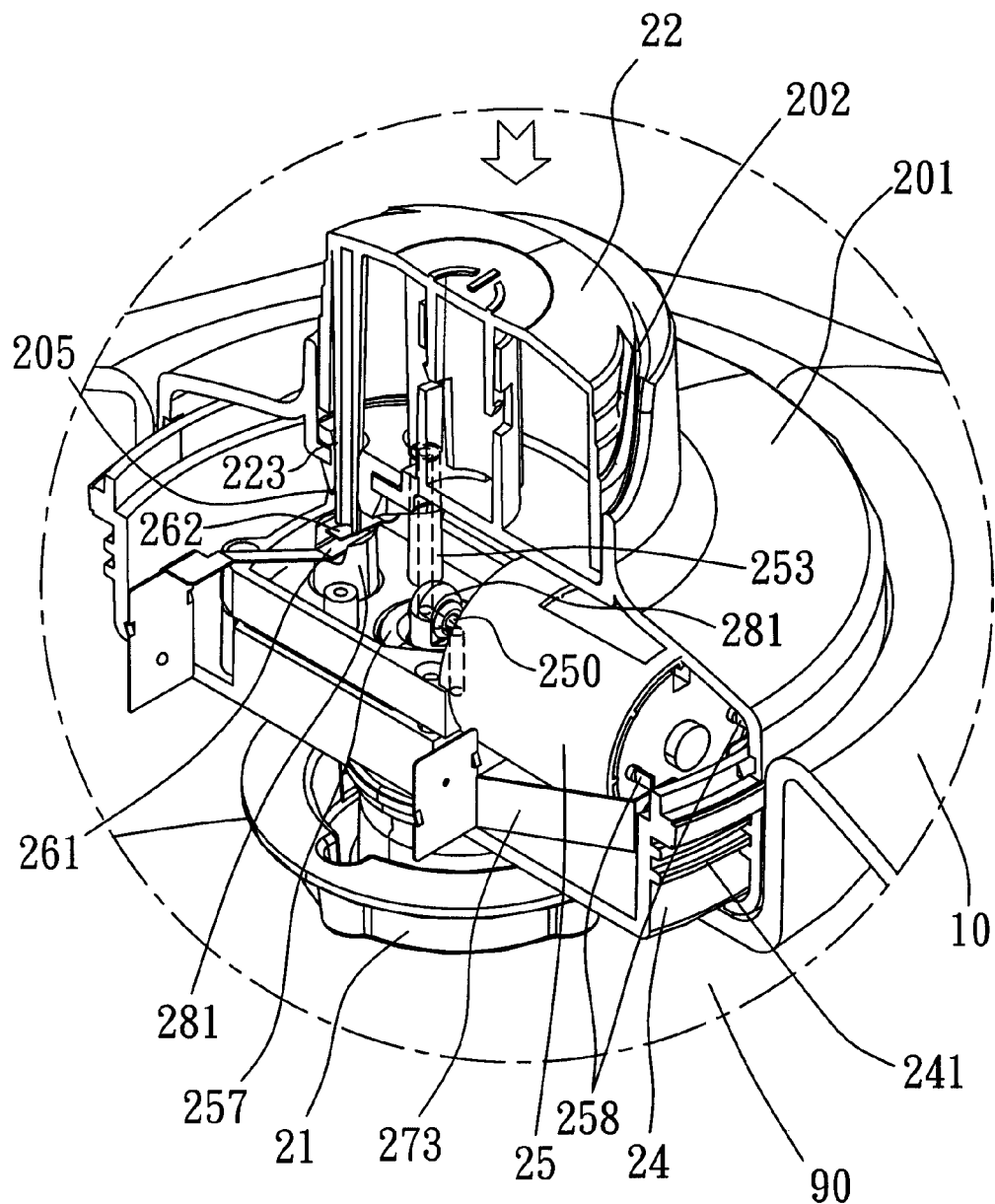
FIG. 7 shows a cutaway view of an action that an air suction pump is activated by pressing down a touching element in an air suction-ventilation device of the present invention.

When the touching element 22 is pressed down and displacing, it will drive and touch the upper spring leaf 262, allowing the upper spring leaf 262 to elastically descend to touch the lower spring leaf 261, so as to manually conduct electricity to the upper and lower spring leaves 262, 261 (or enabling an on state), and to activate the air suction pump 25, such that the air 90 in the container space 12 can be expelled out of the upper cover 10 (as shown in FIG. 7).

Figure 13:
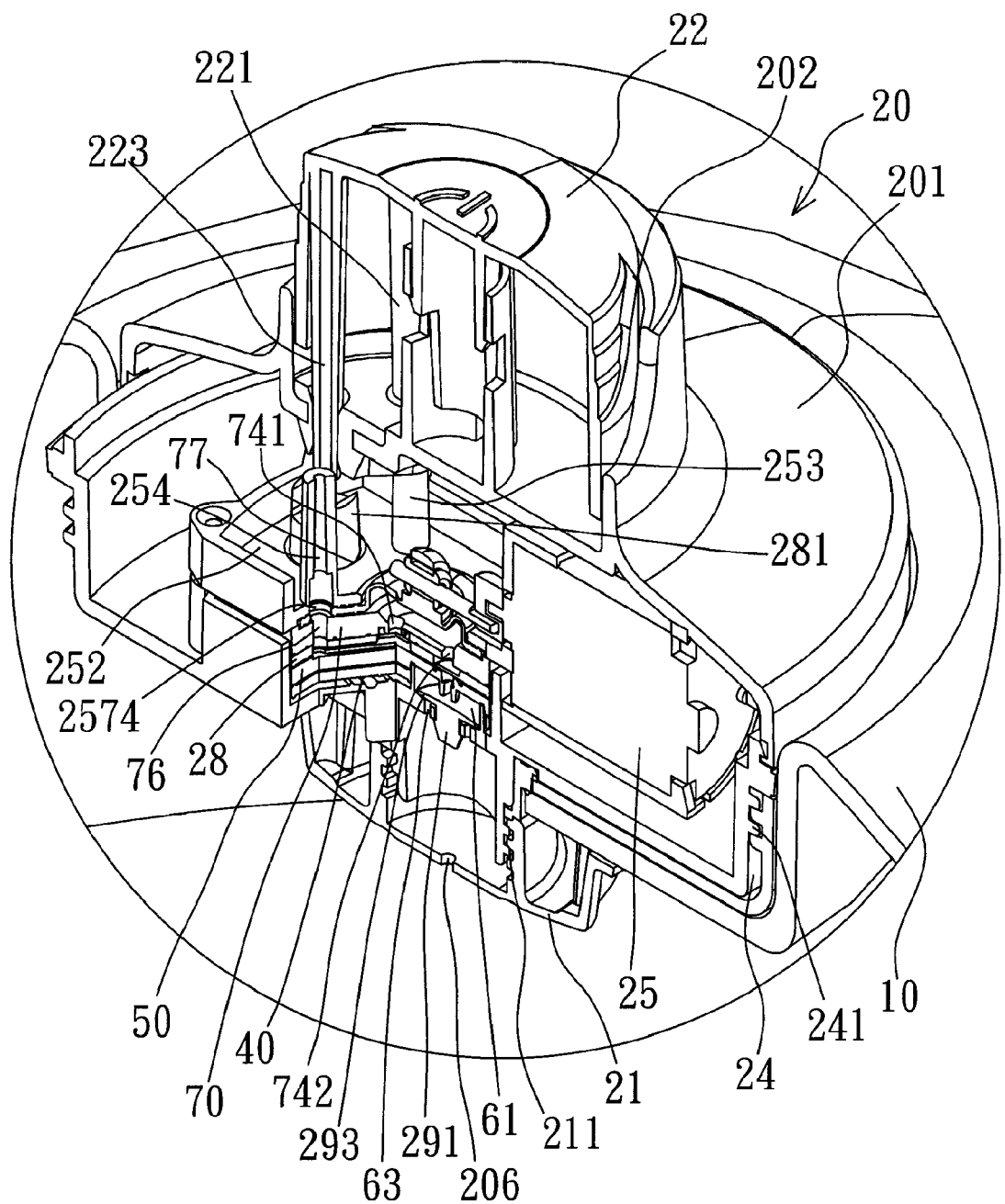
FIG. 13 shows a local cutaway view and a perspective view of the present invention.

Referring to FIG. 13, a lower end of the air suction-ventilation device 20 is provided with a screw tube 23, an outer surface of which is disposed with a male thread 231, with a part of the screw tube 23 above the male thread 231 being mantled and sealed with a soft gasket 232.

Above the upper cover 10 is provided with a through-hole 16 into which the screw tube 23 is transfixed.

An interior of a screw sleeve 21 is provided with a female thread 211, and a bottom of the screw sleeve 21 is provided with a sealing surface which is disposed with the air suction-ventilation hole 206. The female thread 211 is screwed with the male thread 231, and the soft gasket 232 is tightly fitted and abutted at a rim of the through-hole 16, allowing the air suction-ventilation hole 206 to be connected with an interior space of the screw tube 23.

Figure 4:
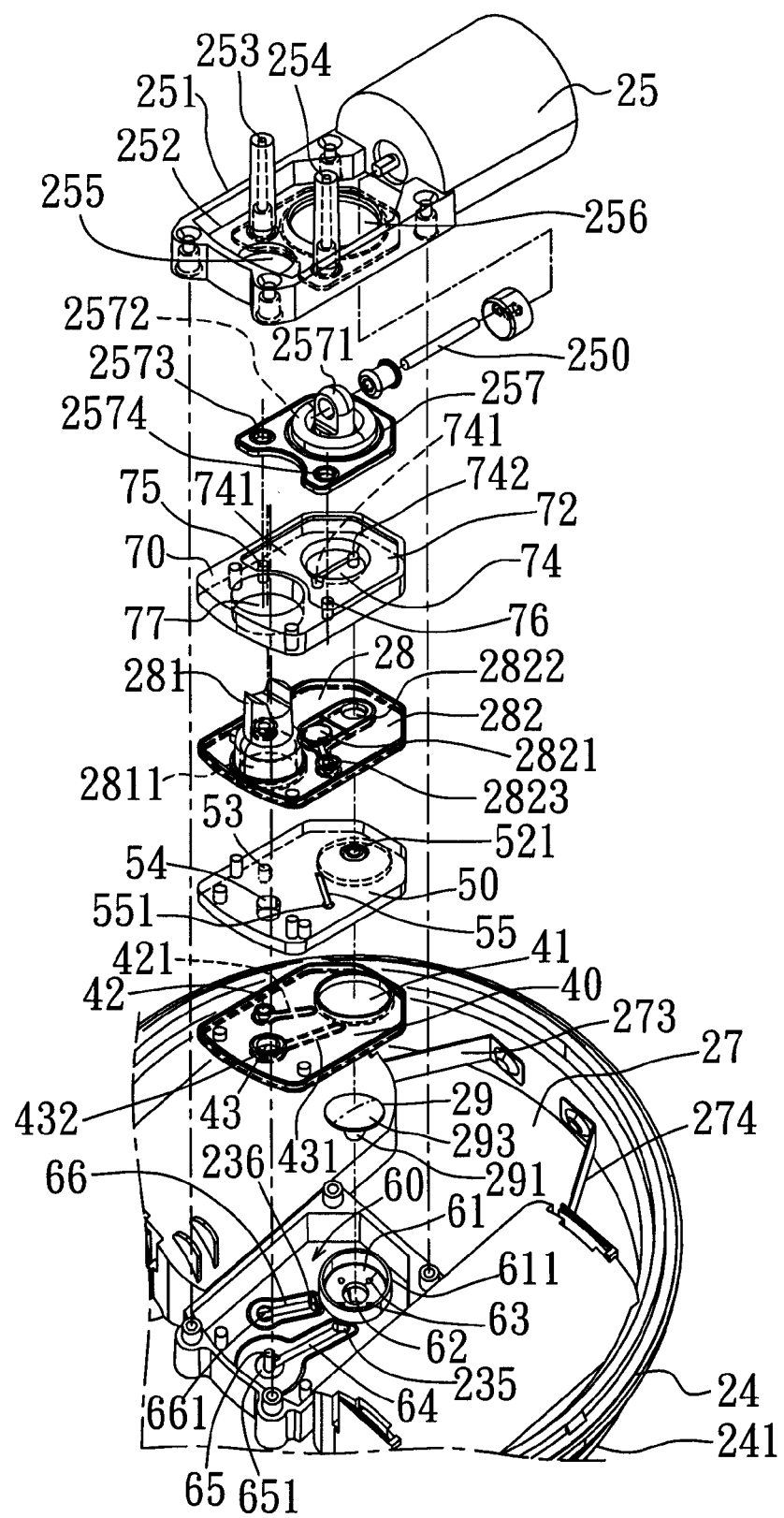
FIG. 4 shows an exploded view of an air suction-ventilation device of the present invention.

A center on a lower surface of a circular ring body 24 of the air suction-ventilation device 20 is integrally formed with the screw tube 23. As shown in FIG. 4, a top surface in an interior of the screw tube 23 is provided respectively with a first venthole 63, a second venthole 236 and a third venthole 235.

Along two side surfaces of the screw tube 23 are provided respectively with a left groove 237 and a right groove 238 (as shown in FIG. 1) for connecting and emplacing batteries.

Referring to FIG. 4, an outer periphery of the circular ring body 24 is provided with a male thread 241.

Figure 6:
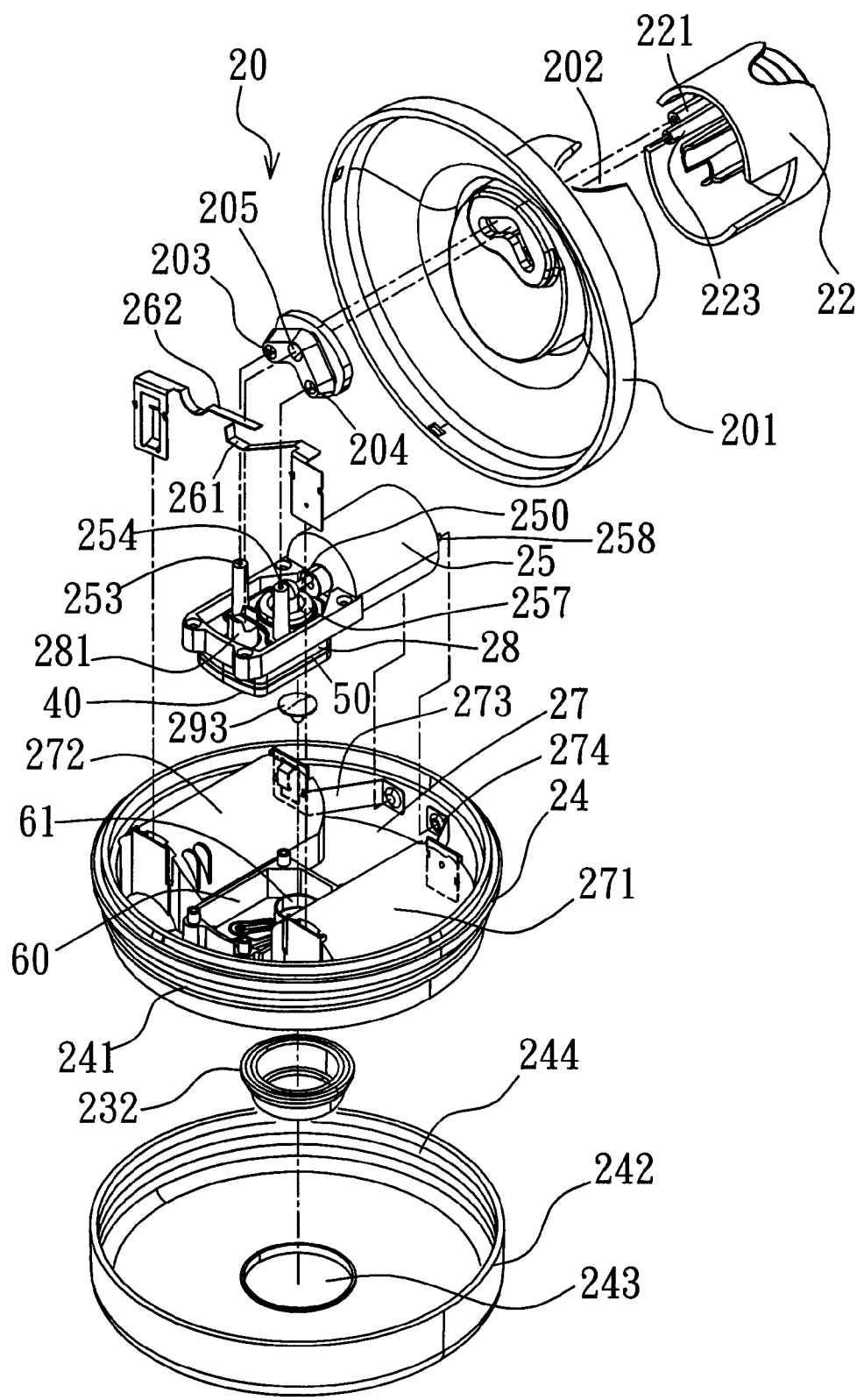
FIG. 6 shows still another exploded view of an air suction-ventilation device of the present invention.

Referring to FIG. 6, an interior of a circular ring inner cap 242 is provided with a central through-hole 243, and an inner wall of a periphery is provided with a female thread 244, with the female thread 244 being screwed with the male thread 241, and the central through-hole 243 being transfixed and tightly fitted with a surface of the soft gasket 232 located at an outer surface of the screw tube 23.

Referring to FIG. 2, an inner wall at a bottom of the soft gasket 30 is formed with an inner cone surface 34 which can be tightly fitted on the horizontal surface 351 (as shown in FIG. 12).

Figure 10:
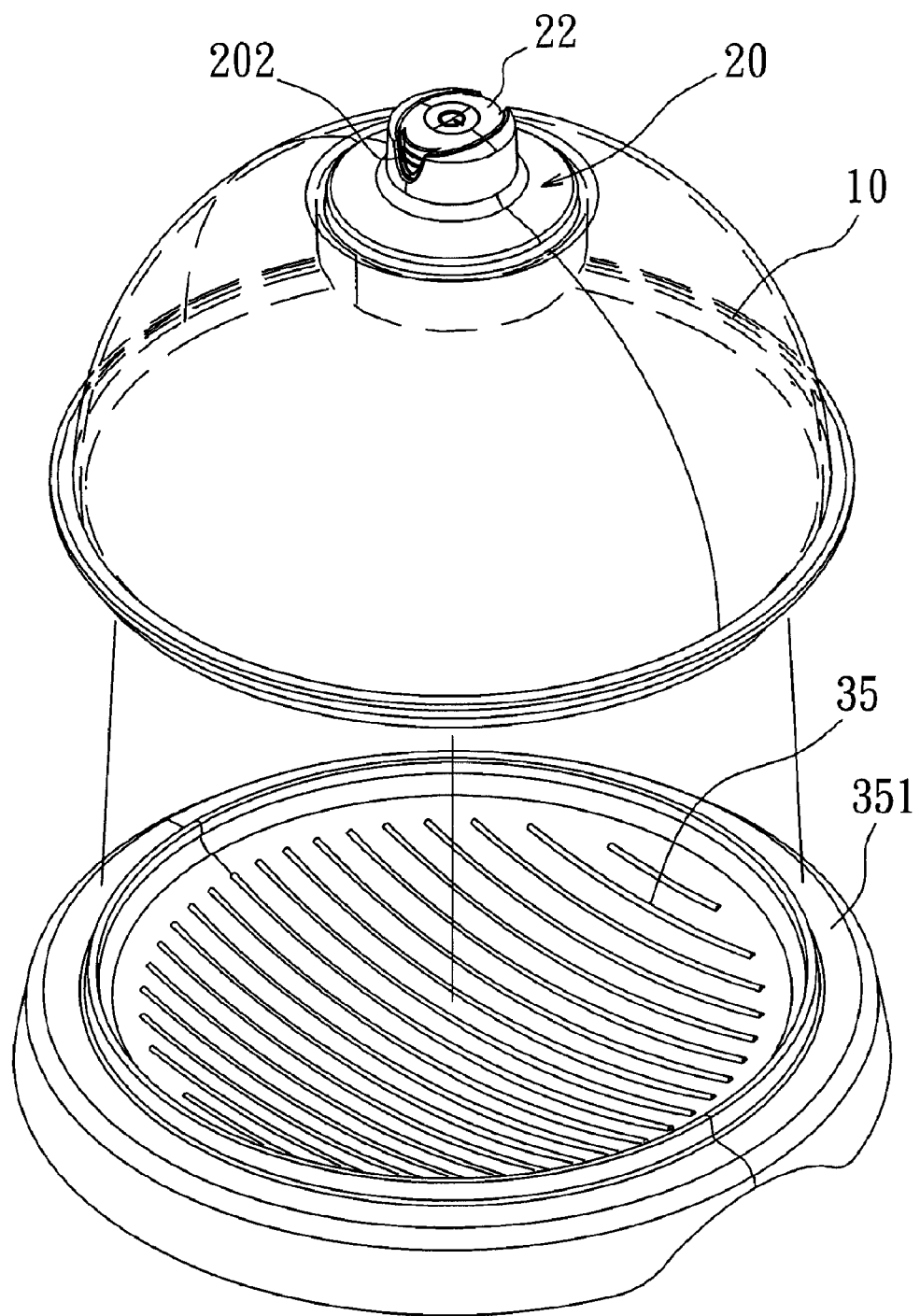
FIG. 10 shows an exploded view of an upper cover and a casing of the present invention.
Figure 11:
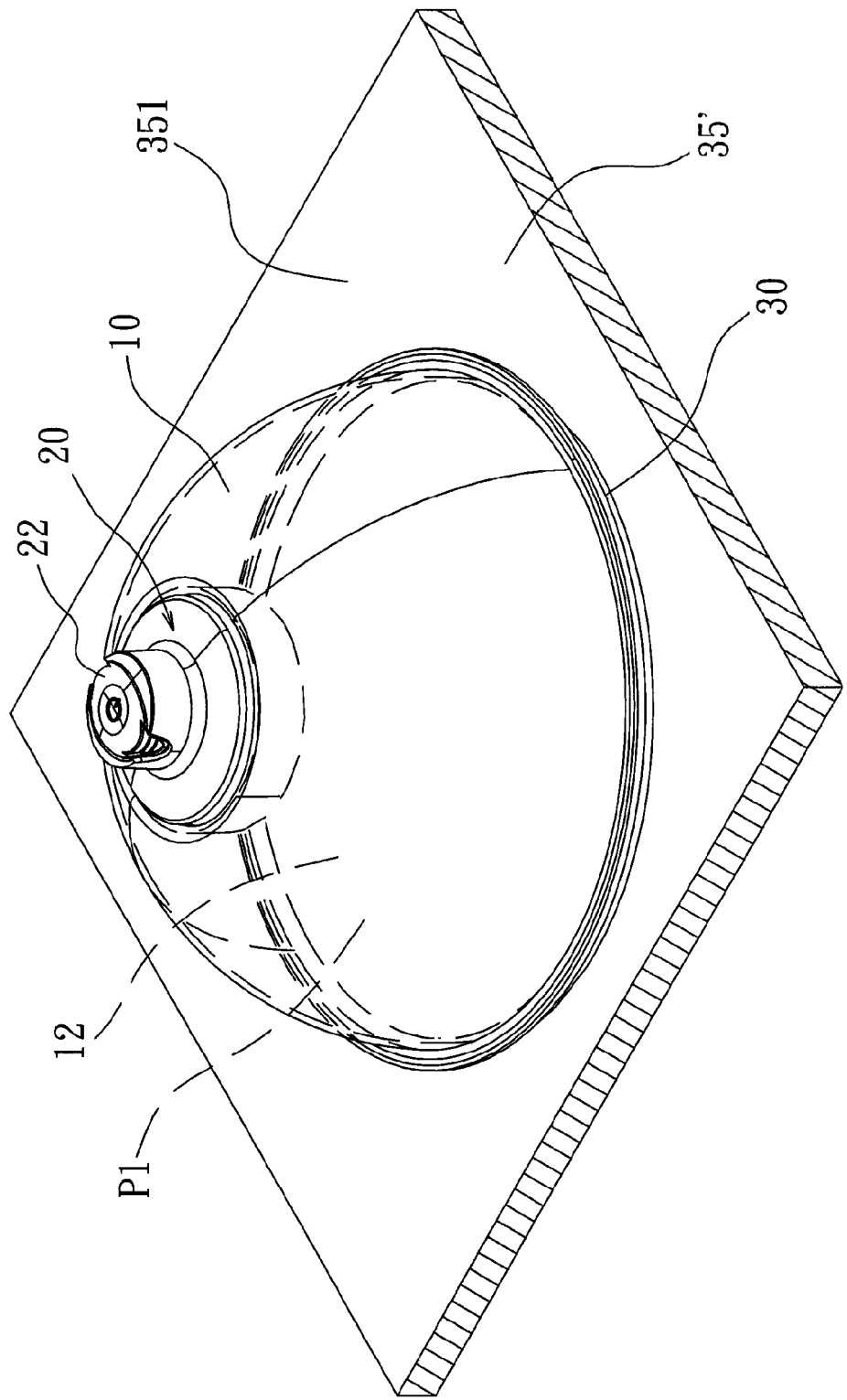
FIG. 11 shows a perspective view of an upper cover of the present invention that is mantled on a desktop.

The surface 351 can be a surface at an outer periphery of a seat 35 (as shown in FIG. 10), or can be a surface of a desktop 35' (as shown in FIG. 11).

Referring to FIG. 4, the air suction pump 25 is provided with a rectangular seat 251, an interior of the rectangular seat 251 is provided with a groove 252 into which is provided respectively with two upright air ducts 253, 254, a first round hole 255 and a second round hole 256; whereas, a soft air driver 257 is fitted into the second round hole 256, a projected body 2571 at a an upper end is connected on an off-center shaft 250 of the air suction pump 25, an interior at a lower end is provided with an air driving chamber 2572 for compression and deformation, and two sides at a front end are provided respectively with a first guide hole 2573 and a second guide hole 2574, with the first guide hole 2573 being connected with the first air duct 253, and the second guide hole 2574 being connected with the second air duct 254.

Figure 5:
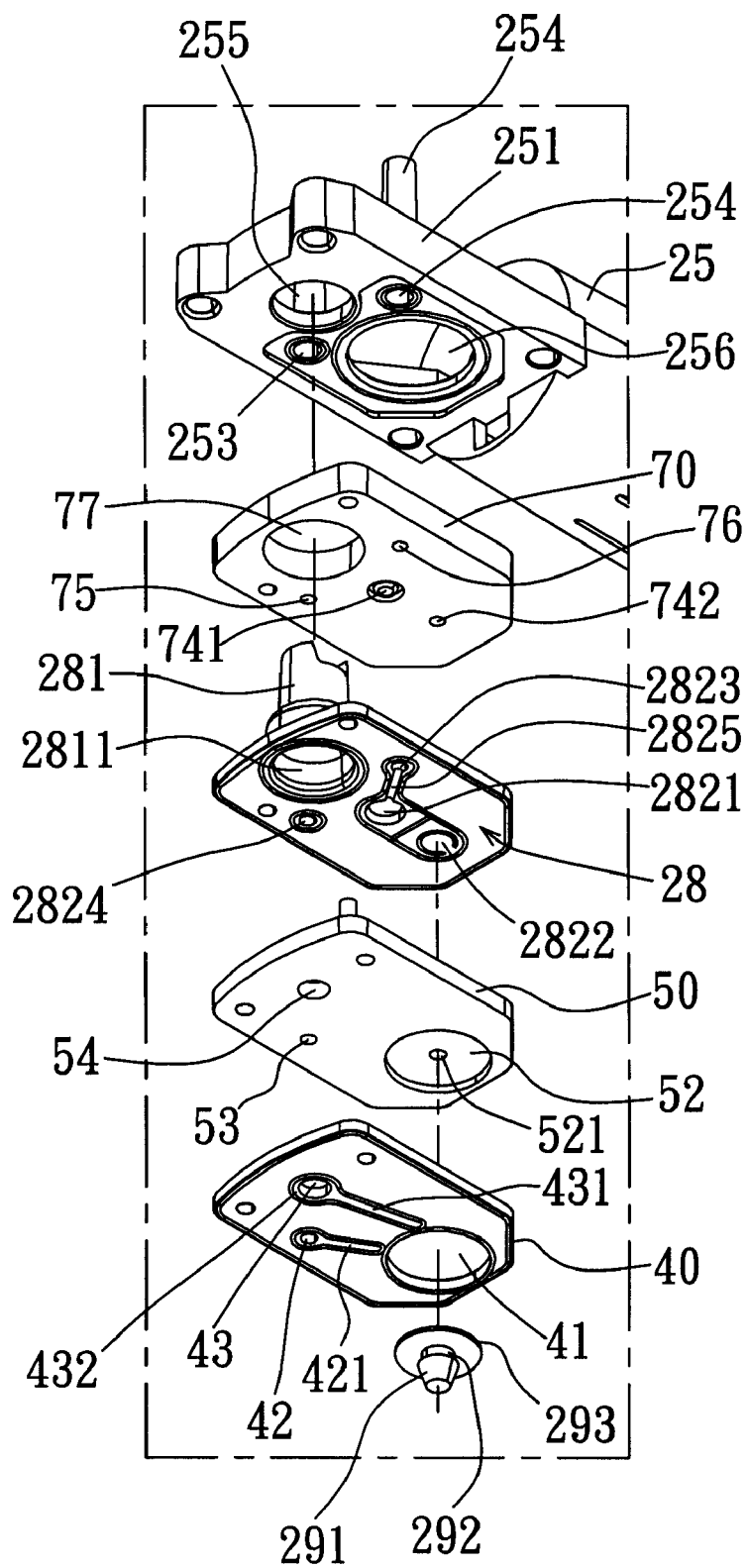
FIG. 5 shows another exploded view of an air suction-ventilation device of the present invention.

The barometric sensing element 28 is made by a flexible material, and is constituted by the projected body 281 and a horizontal rectangular plate 282 at a bottom. An interior of the projected body 281 is provided with a hollow chamber 2811, the projected body 281 is protruded out of the first round hole 255, and the rectangular plate 282 is provided respectively with an upper movable valve reed 2821 and a lower movable valve reed 2822. A lower side of the upper movable valve reed 2821 forms a transversal air access 2825 (as shown in FIG. 5), a tail end of which is formed with a second through-hole 2823 (as shown in FIG. 5). In addition, a first through-hole 2824 is located on the rectangular plate 282, and is correspondingly connected with the first guide hole 2573 and the first air duct 253; whereas, the second through-hole 2823 is correspondingly connected with the second guide hole 2574 and the second air duct 254.

A third hard plate 70 is emplaced in a rectangular recess 60, and is located on a surface of the rectangular plate 282 of the barometric sensing element 28. The third plate 70 is provided with following parts including a shallower first groove 72, an interior of which is dug out with a deeper second groove 74 being provided with a through-hole A (741) and a through-hole B (742), with the through-hole A (741) being mantled and connected on the upper movable valve reed 2821, and the through-hole B (742) being mantled and connected on the lower movable valve reed 2822; a first air permeable hole 75, which is located in the first groove 72, with an upper hole end being connected with the first guide hole 2573 and the first air duct 253, and a lower hole end being connected with the first through-hole 2824 of the barometric sensing element 28 (as shown in FIG. 5); a second air permeable hole 76, which is located in the first groove 72, with an upper hole end being connected with the second guide hole 2574 and the second air duct 254, and a lower hole end being connected with the second through-hole 2823 of the barometric sensing element 28; and a round through-hole 77, which is located at a side of the first groove 72 and sheathed with the projected body 281 of the barometric sensing element 28.

Referring to FIG. 6, a top of the circular ring body 24 of the air suction-ventilation device 20 is connected with an upper cap 201, a top of the upper cap 201 is provided with an insertion slot 202, and a bottom of the insertion slot 202 is provided respectively with a first through-hole 203, a second through-hole 204, and a connection hole 205.

The touching element 22 can be an elliptical housing, with an interior being provided respectively with a first rod 221 and a long rod 223. The touching element 22 is loosely inserted into the insertion slot 202 and can displace up and down vertically in the insertion slot 202. The first rod 221 can be inserted into the first through-hole 203, and the long rod 223 can be inserted into the connection hole 205.

The circular ring body 24 is provided with an internal chamber 27, and an interior of the internal chamber 27 is provided respectively with a left projected body 271 and a right projected body 272. Connection ends of the left and right projected bodies 271, 272 are connected respectively with metallic conducting pieces 273, 274 to serve as connection of electrodes 258 of the air suction pump 25. Other ends of the left and right projected bodies 271, 272 are connected respectively with the metallic upper spring leaf 262 and lower spring leaf 261. Two contact ends of the upper and lower spring leaves 262, 261 can be contacted and separated properly, to control electric activation and deactivation of the air suction pump 25.

An interior of the internal chamber 27 is further provided with the rectangular recess 60 (as shown in FIG. 4), an interior of the rectangular recess 60 is provided with an inner circular groove 61, a bottom of the inner circular groove 61 is provided with a connection hole 62, and along a periphery of the connection hole 62 is provided with at least one first venthole 63.

An upper surface of a flexible membrane element 29 is a circular membrane 293, a lower end is provided with a cone-shape pillar 291 and a neck part 292, the cone-shape pillar 291 is transfixed and tightly fitted into the connection hole 62, the circular membrane 293 is loosely connected into a slot surface of the inner circular groove 61 to close and open the first venthole 63, a side of the inner circular groove 61 is concaved with a second access 64, and a tail end of the second access 64 is put up with a post 65.

A side of the inner circular groove 61 is concaved with a first access 66, and a tail end of the first access 66 is formed with a small circular groove 661.

Referring to FIG. 4 and FIG. 5, an interior of the rectangular recess 60 is emplaced with a first soft plate 40, and a body of the first plate 40 is provided respectively with a large circular hole 41, a first through-hole 42, with a hole wall being linearly disposed with a first trench 421 correspondingly mantled on the first access 66 in the rectangular recess 60 to form an air passage; and a second through-hole 43, with a hole wall being linearly disposed with a second trench 431 tightly fitted into the post 65 of the rectangular recess 60 to form an air gap 432. The second trench 431 is correspondingly mantled on the second access 64 to form an air passage, and the large circular hole 41 is sheathed on a side surface of a projected ring 611 of the inner circular groove 61.

Referring to FIG. 4 and FIG. 5, an interior of the rectangular recess 60 is emplaced with a second hard plate 50 which is mantled on a surface of the first plate 40, and is provided respectively with an inner groove 52 (as shown in FIG. 5), an interior of which being provided with an air permeable hole 521, and which being correspondingly mantled into the large circular hole 41 of the first plate 40; a first air permeable hole 53, which is correspondingly connected with the first through-hole 42 on the first plate 40; a second air permeable hole 54, which is correspondingly connected with the second through-hole 43 of the first plate 40; and a linear trench 55, which is formed on an upper surface of the second plate 50, with a tail end of the trench 55 forming a small circular groove 551.

Referring to FIG. 4, the second venthole 236 is connected with the first access 66 which is in a linear trench-shape, and with the small circular groove 661. Above the small circular groove 661 is connected with the first through-hole 42, wherein the first trench 421 is correspondingly connected with the first access 66; the first through-hole 42 is correspondingly connected with the first air permeable hole 53; the first air permeable hole 53 is correspondingly connected with the first through-hole 2824, and the first air permeable hole 75 on the third plate 70; the first air permeable hole 75 is correspondingly connected with the first guide hole 2573; the first guide hole 2573 is correspondingly connected with the first air duct 253; and the top end of the first air duct 253 is connected with the first through-hole 203. Therefore, when the rod 221 is pressed down, the first through-hole 203 will be closed, and no air will be guided (as shown in FIG. 6).

Referring to FIG. 4 and FIG. 5, the third venthole 235 is connected with the second access 64, which is in a linear trench-shape; the second through-hole 43 on the first soft plate 40 is loosely fitted into the post 65; the circular groove 651 below the post 65 forms the air gap 432 into which the air is connected, along with the second through-hole 43; and the circular groove 651 is connected with the second access 64. The linear trench 431 is corresponding to and connected with the second access 64 to form a passage, the air gap 432 is formed between the post 65 and the second through-hole 43, the second air permeable hole 54 is transfixed with the post 65, the air gap 432 is formed between the second air permeable hole 54 and the post 65, and the hollow chamber 2811 of the barometric sensing element 28 is covered into the second air permeable hole 54.

The outer periphery of the inner circular groove 61 is provided with the projected ring 611, the large circular hole 41 is sheathed with the projected ring 611, and is mantled and closed by the inner groove 52. A top of the air permeable hole 521 in the inner groove 52 is correspondingly connected with the lower movable valve reed 2822, the lower movable valve reed 2822 is corresponding to the through-hole B (742), and the through-hole B (742) is correspondingly connected with the air driving chamber 2572, which is in a sealed condition (as shown in FIG. 13).

The linear trench 55 on the surface of the second plate 50 is correspondingly connected with the air access 2825 (as shown in FIG. 5), the second through-hole 2823 is corresponding to the small circular groove 551, the lower hole end of the through-hole A (741) is corresponding to the upper movable valve reed 2821, and the upper hole end of the through-hole A (741) is correspondingly connected with the air driving chamber 2572.

Referring to FIG. 12, when the touching element 22 is pressed down and the upper cover 10 is suppressed on the horizontal surface 351 by human fingers, the soft gasket 30 can flexibly deform downward and be tightly fitted on the surface 351. At this time, the container space 12 will be diminished a little by this downward deformation of the soft gasket 30, and the local air 90 in the container space 12 will flow respectively into the first, second, and third venthole 63, 236, 235.

Figure 14:
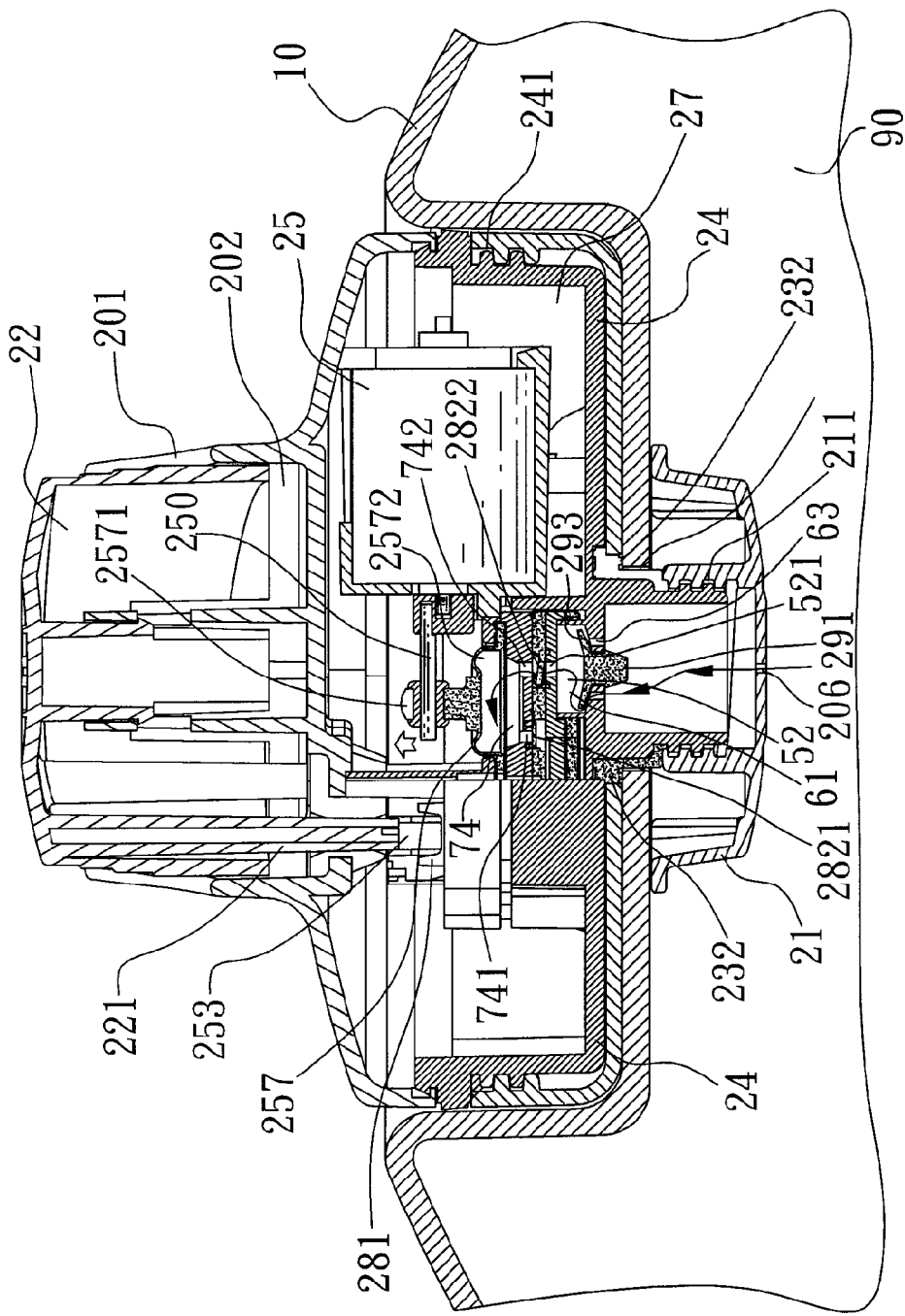
FIG. 14 shows a cross sectional view of an action that air is sucked by the present invention.

Referring to FIG. 14, when the air 90 flows into the first venthole 63 from the air suction-ventilation hole 206, the air pressure is sufficient to attack the circular membrane 293 to deform, so as to form an air gap, allowing the air 90 to enter into the inner circular groove 61 and the inner groove 52, and then, through the air permeable hole 521, to force the lower movable valve reed 2822 to open upward an air gap for the air to flow into the through-hole B (742), the first groove 74, and the air driving chamber 2572. As the air driving chamber 2572 is a closed type, the return flow of air will suppress the upper movable valve reed 2821 to deform downward, thereby forming an air gap (as shown in FIG. 4). Therefore, the air 90 will flow along the trench 55, and be driven out of the insertion slot 202 through the second through-hole 2823, the second air permeable hole 76, the second guide hole 2574, the second venthole 254, and finally the second through-hole 204 (as shown in FIG. 6), which further allows the container space 12 to be diminished due to ventilation. In addition, as shown in FIG. 4, the air 90 will flow into the second access 64 and the circular groove 651 from the third venthole 235, and be expelled upward into the chamber 2811 along the second through-hole 43, allowing the chamber 2811 to flexibly displace and to be restored upward, thereby lifting up the projected body 281. On the other hand, the air 90 will flow into a linear air passage constituted by the first trench 421 and the first access 66 from the second venthole 236, and flow upward through the first through-hole 42, the first air permeable hole 53, the first through-hole 2824 (as shown in FIG. 5), the first air permeable hole 75, the first guide hole 2573, and the first air duct 253. At this time, due to that the first air duct 253 is inserted into the first through-hole 203, an exit of the first through-hole 203 is closed by being inserted with the first rod 221 (as shown in FIG. 6), and therefore, the air 90 can only flow until the first through-hole 203.

Figure 15:
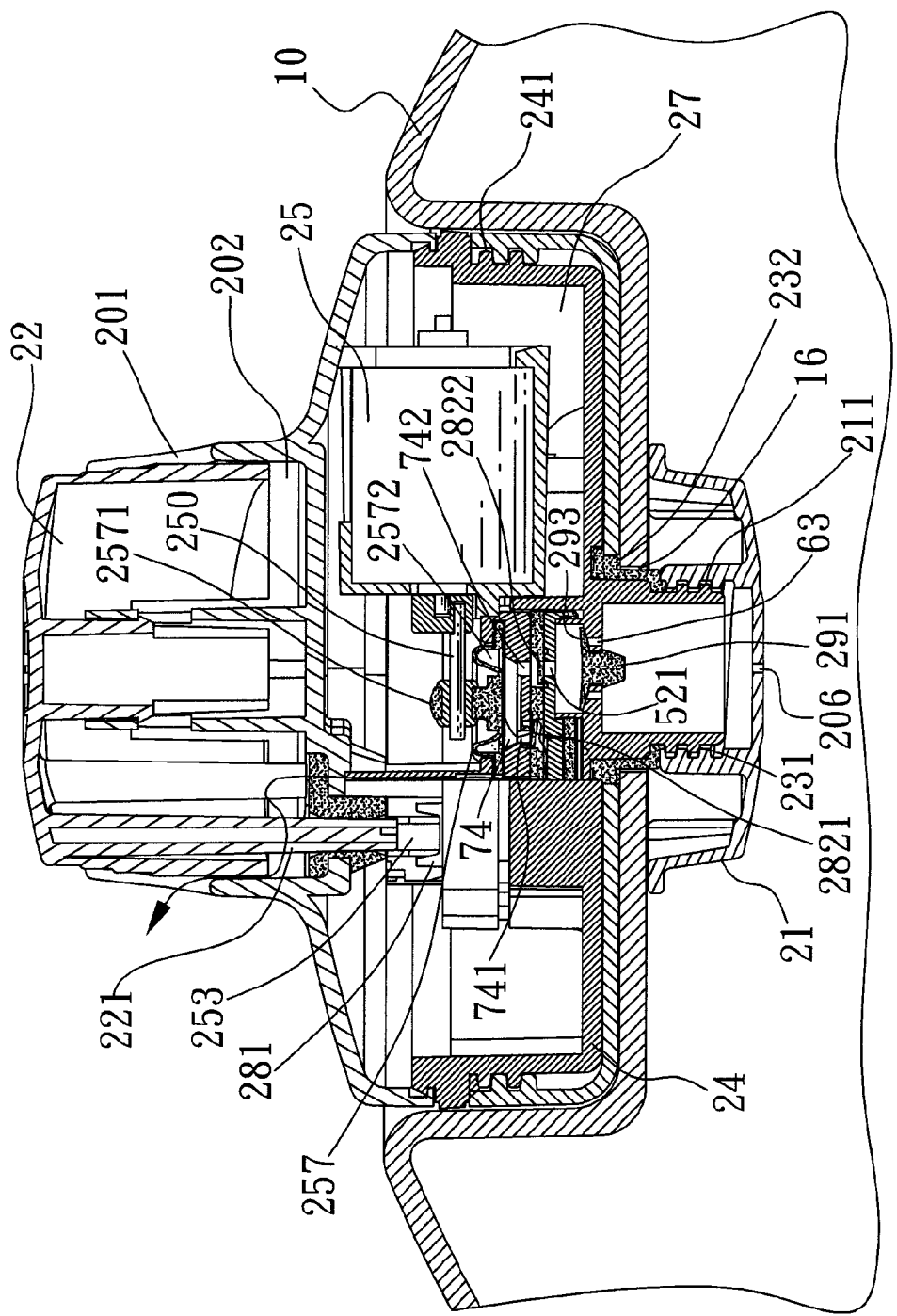
FIG. 15 shows a cross sectional view of an action that air is ventilated by the present invention.

Referring to FIG. 7, when the touching element 22 is pressed down, a manual ventilation operation is performed, wherein the first rod 221 is inserted to close the first through-hole 203, the long rod 223 is extended out of the connection hole 205, and an end part of the long rod 223 abuts at the upper spring leaf 262 to flexibly deform downward. In a mean time, as the chamber 2811 is filled with the air, the projected body 2811 will drive the lower spring leaf 261 to flexibly displace upward. As the projected body 281 is abutted with the lower spring leaf 261, the contact ends of the upper and lower spring leaves 262, 261 are in touch with each other electrically to conduct an electric circuit for activating the air suction pump 25. Therefore, the off-center shaft 250 will rotate along an arc line to drive the air driver 257 to displace up and down intermittently, allowing a container space of the air driving chamber 2572 to be diminished and enlarged intermittently (as shown in FIG. 14 and FIG. 15). When the space of the air driving chamber 2572 is diminished, an air driving operation is manifested (as shown in FIG. 15); whereas, when the space of the air driving chamber 2572 is restored (or enlarged), an air suction operation is manifested. The air suction operation is described as follows.

Referring to FIG. 14, the upper movable valve reed 2821 displaces upward to seal the through-hole A (741), the lower movable valve reed 2822 deforms upward to form the air gap, and the through-hole B (742) is opened. Therefore, an edge of the circular membrane 293 will deform upward to form the air gap 432, and the air 90 in the container space 12 will flow through the air gap 432 from the first venthole 63, be drained out of the through-hole B (742) next, and then enter into the second groove 74 and the air driving chamber 2572. As the air driving chamber 2572 is closed, the air 90 will be returned in the air driving chamber 2572 and the second groove 74.

For the air driving (draining) operation, please refers to FIG. 15, wherein the projected body 2571 displaces downward to flexibly compress the air driving chamber 2572, allowing the air pressure to operate on the surface of the upper movable valve reed 2821, such that an air gap is opened downward by the upper movable valve reed 2821. On the other hand, the air permeable hole 521 is closed by the lower movable valve reed 2821 by the operation of air pressure, and the air will flow through the air gap to the air access 2825, the second through-hole 2823, the second air permeable hole 76, and the second air duct 254 (as shown in FIG. 5). As a tube end of the second air duct 254 passes through the second throughhole 204 as shown in FIG. 6, and is further connected with the insertion slot 202 of the upper cap 201, ambient air is connected. Therefore, the air flow in the air driving chamber 2572 and the second groove 74, as shown in FIG. 15, will be expelled out by the second air duct 254. At this time, as the lower movable valve reed 2821 is closed, the circular membrane 293 will close the first venthole 63, and the air in the container space 12 will not be conducted into the first venthole 63.

Figure 9:
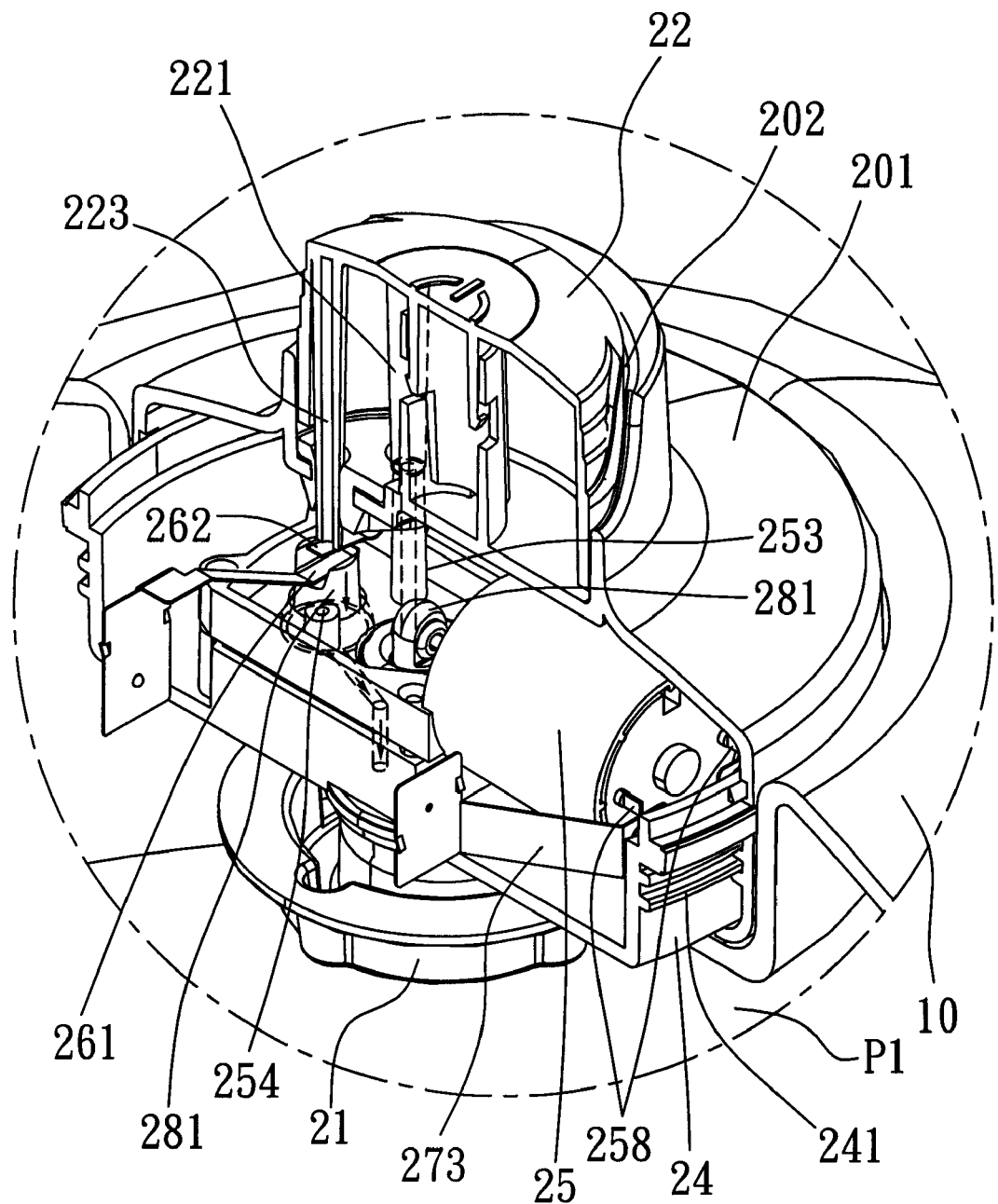
FIG. 9 shows a cutaway view of an action that a container space of an upper cover of the present invention is drawn to a negative pressure condition.

For the displacement operation of the projected body 281 of the barometric sensing element 28, please refers to FIG. 10, wherein when the barometric value P1 inside the container space 12 decreases continuously, the air will be expelled into the container space 12 through the chamber 2811, the second air permeable hole 54, the second through-hole 43, the circular groove 651, the second trench 431, the second access 64, and further the third venthole 235, allowing the chamber 2811 to be flexibly shrunk and diminished. In addition, the projected body 281 is descended (as shown in FIG. 15), which further drives the lower spring leaf 261 to descend, allowing the lower spring leaf 261 to be released from the upper spring leaf 262, and the electric circuit to be at an off state (as shown in FIG. 9). Therefore, the air suction pump 25 will stop working. At this time, the barometric value P1 of the container space 12 is much lower than the barometric pressure of the ambient air, to form a negative pressure condition. Hence, food or objects (not shown in the drawing) in the container space 12 will be kept fresh.

Referring to FIG. 11, if the soft gasket 30 leaks, the ambient air will penetrate into the container space 12, and the barometric pressure P1 will rise up. As shown in FIG. 4, as the air in the container space 12 will first pass through the first venthole 235, the second access 64, the circular groove 651, and the second through-hole 43, and further enter into the chamber 2811, allowing the chamber 2811, which was originally in a diminished state, to be restored gradually, which enables the projected body 281 to displace upward slowly, to simultaneously drive the contact end of the lower spring leaf 261 to displace upward, to touch the contact end of the upper spring leaf 262 (as shown in FIG. 7), thereby energizing the electric circuit (or enabling the electric circuit to be in an on state) and activating the air suction pump 25 to carry out the aforementioned reciprocative operation of air driving and suction, so as to draw the air 90 in the container space 12 out of the upper cover 10. When the barometric pressure P1 of the container space 12 decreases again to a certain value, similarly, the lower spring leaf 261 will be released from the upper spring leaf 262, the electric circuit is put in the off-circuit condition, and the air suction pump 25 stops working. When the container space 12 is in the negative pressure condition, the upper cover 10 will be pulled up from the surface 351, by the operations as described below.

Referring to FIG. 8, the touching element 22 is grabbed and pulled upward by the human fingers, allowing the touching element 22 to displace upward in the insertion slot 202, as shown in FIG. 6. The long rod 223 will displace upward from the connection hole 205, which further enables the upper spring leaf 262 to be restored upward, and the first rod 221 to displace upward in the first through-hole 203. Therefore, the first through-hole 203 will be connected with the ambient air; the ambient air will enter into the first air duct 253, the first air permeable hole 75, the first through-hole 2824, the first air permeable hole 53, the first through-hole 42 and the first trench 421, through the first through-hole 203; and the first trench 421 will be connected with the first access 66. Therefore, the air will be driven into the container space 12 from the second venthole 236, the barometric value P1 of the container space 12 will increase, and the negative pressure condition will disappear. Hence, the soft gasket 30 at the lower edge of the upper cover 10 will be flexibly restored upward to easily escape from the surface 351, such that the upper cover 10 can be easily removed (as shown in FIG. 10).

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A vacuum fresh-keeping cover comprising an upper cover, an interior of which is provided with a container space, a top of which is connected to an air suction-ventilation device, and a lower rim of which is provided with a connecting part; a soft gasket, a side of which is provided with a connecting slot, with the connecting slot being air-tightly fitted into the connecting part and the soft gasket flexibly deforming downward in an air-tight condition, so as to be tightly suppressed on a surface; the air suction-ventilation device which is connected above the upper cover and is composed of a bottom air suction-ventilation hole being connected with the container space, a top touching element being able to displace up and down, an air suction pump, and a lower spring leaf and an upper spring leaf at a side of the air suction pump; and a barometric sensing element, a top of which is provided with a projected body being connected at the lower spring leaf, such that when a barometric value of the container space is detected high by the barometric sensing element, the barometric sensing element is driven by the high barometric value to be flexibly ascended and restored, so as to drive simultaneously the lower spring leaf to ascend to touch the upper spring leaf, thereby conducting an electric circuit to activate the air suction pump for drawing air inside the container space out of the upper cover through the air suction-ventilation hole, whereas, when the barometric value of the container space decreases, the barometric sensing element flexibly descending and displacing by an operation of a negative pressure in the container space, to drive the lower spring leaf to descend and displace, thereby forming an off-circuit condition by the upper and lower spring leaves to stop the air suction pump.

2. The vacuum fresh-keeping cover according to claim 1, wherein the touching element is pressed down and displacing to drive and touch the upper spring leaf, allowing the upper spring leaf to elastically descend to touch the lower spring leaf, so as to manually conduct electricity to the upper and lower spring leaves, and to activate the air suction pump, thereby expelling the air in the container space out of the upper cover.

3. The vacuum fresh-keeping cover according to claim 1, wherein a lower end of the air suction-ventilation device is provided with a screw tube, an outer surface of which is disposed with a male thread, with a part of the screw tube above the male thread being mantled and sealed with a soft gasket; above the upper cover being provided with a through-hole into which the screw tube is transfixed; a screw sleeve, an interior of which is provided with a female thread, and a bottom of which is provided with a sealing surface being disposed with the air suction-ventilation hole; the female thread being screwed with the male thread, and the soft gasket being tightly fitted and abutted at a rim of the through-hole, allowing the air suction-ventilation hole to be connected with an interior space of the screw tube.

4. The vacuum fresh-keeping cover according to claim 3, wherein a center on a lower surface of a circular ring body of the air suction-ventilation device is integrally formed with the screw tube, a top surface in an interior of the screw tube is provided respectively with a first venthole, a second venthole and a third venthole; along two side surfaces of the screw tube being provided respectively with a left groove and a right groove for connecting and emplacing batteries; an outer periphery of the circular ring body being provided with a male thread; a circular ring inner cap, an interior of which is provided with a central through-hole, and an inner wall of a periphery of which is provided with a female thread, with the female thread being screwed with the male thread, and the central through-hole being transfixed and tightly fitted with a surface of the soft gasket located at an outer surface of the screw tube.

5. The vacuum fresh-keeping cover according to claim 4, wherein a top of the circular ring body of the air suction-ventilation device is connected with an upper cap, a top of the upper cap is provided with an insertion slot, and a bottom of the insertion slot is provided respectively with a first through-hole, a second through-hole, and a connection hole; the touching element being an elliptical housing, with an interior being provided respectively with a first rod and a long rod; the touching element being loosely inserted into the insertion slot and displacing up and down vertically in the insertion slot; the first rod being inserted into the first through-hole, and the long rod being inserted into the connection hole.

6. The vacuum fresh-keeping cover according to claim 4, wherein the circular ring body is provided with an internal chamber, and an interior of the internal chamber is provided respectively with a left projected body and a right projected body, connection ends of the left and right projected bodies being connected respectively with metallic conducting pieces to serve as connection of electrodes of the air suction pump; other ends of the left and right projected bodies being connected respectively with the metallic upper spring leaf and lower spring leaf; two contact ends of the upper and lower spring leaves being contacted and separated properly, to control electric activation and deactivation of the air suction pump.

7. The vacuum fresh-keeping cover according to claim 6, wherein an interior of the internal chamber is further provided with the rectangular recess, an interior of the rectangular recess is provided with an inner circular groove, a bottom of the inner circular groove is provided with a connection hole, and along a periphery of the connection hole is provided with at least one first venthole; a flexible membrane element, an upper surface of which is a circular membrane, a lower end of which is provided with a cone-shape pillar and a neck part, with the cone-shape pillar being transfixed and tightly fitted into the connection hole; the circular membrane being loosely connected into a slot surface of the inner circular groove to close and open the first venthole, a side of the inner circular groove being concaved with a second access, and a tail end of the second access being put up with a post; a side of the inner circular groove being concaved with a first access, and a tail end of the first access being formed with a small circular groove.

8. The vacuum fresh-keeping cover according to claim 7, wherein an interior of the rectangular recess is emplaced with a first soft plate, and a body of the first plate is provided respectively with a large circular hole, a first through-hole, with a hole wall being linearly disposed with a first trench correspondingly mantled on the first access in the rectangular recess to form an air passage; and a second through-hole, with a hole wall being linearly disposed with a second trench tightly fitted into the post of the rectangular recess to form an air gap; the second trench being correspondingly mantled on the second access to form an air passage, and the large circular hole being sheathed on a side surface of a projected ring of the inner circular groove.

9. The vacuum fresh-keeping cover according to claim 8, wherein an interior of the rectangular recess is emplaced with a second hard plate which is mantled on a surface of the first plate, and is provided respectively with an inner groove, an interior of which being provided with an air permeable hole, and which being correspondingly mantled into the large circular hole of the first plate; a first air permeable hole, which is correspondingly connected with the first through-hole on the first plate; a second air permeable hole, which is correspondingly connected with the second through-hole of the first plate; and a linear trench, which is formed on an upper surface of the second plate, with a tail end of the trench forming a small circular groove.

10. The vacuum fresh-keeping cover according to claim 1, wherein an inner wall at a bottom of the soft gasket is formed with an inner cone surface which is tightly fitted on a horizontal surface.

11. The vacuum fresh-keeping cover according to claim 1, wherein the surface is a surface at an outer periphery of a seat.

12. The vacuum fresh-keeping cover according to claim 1, wherein the surface is a surface of a desktop.

13. The vacuum fresh-keeping cover according to claim 1, wherein the air suction pump is provided with a rectangular seat, an interior of the rectangular seat is provided with a groove into which is provided respectively with two upright air ducts, a first round hole and a second round hole; whereas, a soft air driver being fitted into the second round hole, a projected body at a an upper end being connected on an off-center shaft of the air suction pump, an interior at a lower end being provided with an air driving chamber for compression and deformation, and two sides at a front end being provided respectively with a first guide hole and a second guide hole, with the first guide hole being connected with the first air duct, and the second guide hole being connected with the second air duct; the barometric sensing element being made by a flexible material, and being constituted by the projected body and a horizontal rectangular plate at a bottom; an interior of the projected body being provided with a hollow chamber, the projected body being protruded out of the first round hole, and the rectangular plate being provided respectively with an upper movable valve reed and a lower movable valve reed; a lower side of the upper movable valve reed forming a transversal air access, a tail end of which is formed with a second through-hole; a first through-hole being located on the rectangular plate and correspondingly connected with the first guide hole and the first air duct, whereas, the second through-hole being correspondingly connected with the second guide hole and the second air duct.

14. The vacuum fresh-keeping cover according to claim 1, wherein a third hard plate is emplaced in a rectangular recess, and is located on a surface of the rectangular plate of the barometric sensing element; the third plate being provided with following parts including a shallower first groove, an interior of which is dug out with a deeper second groove being provided with a through-hole A and a through-hole B, with the through-hole A being mantled and connected on the upper movable valve reed, and the through-hole B being mantled and connected on the lower movable valve reed; a first air permeable hole, which is located in the first groove, with an upper hole end being connected with the first guide hole and the first air duct, and a lower hole end being connected with the first through-hole of the barometric sensing element; a second air permeable hole, which is located in the first groove, with an upper hole end being connected with the second guide hole and the second air duct, and a lower hole end being connected with the second through-hole of the barometric sensing element; and a round through-hole, which is located at a side of the first groove and sheathed with the projected body of the barometric sensing element.

* * * * *